(12) United States Patent
Birkheim et al.

(10) Patent No.: US 11,066,094 B2
(45) Date of Patent: Jul. 20, 2021

(54) STEERING COLUMN ASSEMBLY

(71) Applicant: TRW Automotive GmbH, Alfdorf (DE)

(72) Inventors: Andreas Birkheim, Cologne (DE); Stephan Hänisch, Essen (DE)

(73) Assignee: ZF Automotive Germany GmbH, Alfdorf (DE)

( * ) Notice: Subject to any disclaimer, the term of this patent is extended or adjusted under 35 U.S.C. 154(b) by 158 days.

(21) Appl. No.: 16/435,627

(22) Filed: Jun. 10, 2019

(65) Prior Publication Data
US 2019/0375445 A1 Dec. 12, 2019

(30) Foreign Application Priority Data

Jun. 11, 2018 (DE) .......................... 102018113817.2

(51) Int. Cl.
*B62D 1/19* (2006.01)
(52) U.S. Cl.
CPC ............. *B62D 1/192* (2013.01); *B62D 1/195* (2013.01)
(58) Field of Classification Search
CPC ................................ B62D 1/192; B62D 1/195
USPC ...................................................... 74/492, 493
See application file for complete search history.

(56) References Cited

U.S. PATENT DOCUMENTS

| 5,609,364 A * | 3/1997 | Fouquet ................. | B62D 1/195 280/777 |
| 10,577,011 B2 * | 3/2020 | Kingston-Jones ..... | B62D 1/195 |
| 2008/0174095 A1* | 7/2008 | Ridgway ................. | F16F 7/125 280/777 |
| 2009/0033082 A1* | 2/2009 | Klukowski ............. | F16F 1/361 280/777 |
| 2014/0026707 A1* | 1/2014 | Yokota ................... | B62D 1/187 74/493 |
| 2019/0023303 A1* | 1/2019 | Wojtalik ................ | B62D 1/185 |
| 2020/0079417 A1* | 3/2020 | Haenisch ............... | B62D 1/192 |

FOREIGN PATENT DOCUMENTS

DE 102017110868 A1 11/2018

* cited by examiner

*Primary Examiner* — Toan C To
(74) *Attorney, Agent, or Firm* — Robert James Harwood

(57) ABSTRACT

A steering column assembly for a vehicle, with a vehicle-fixed storage element and on which a storage element is stored, wherein the receiving element is in operative connection with a steering wheel arrangement, an energy absorption device, an effective connection with the storage element and the receiving element and which provides for at least one elongated absorption member as well as at least one reduction member with a passage for the absorption member, through which the absorption member extends and which at least partially has a smaller Q1 cross section compared to a Q2 cross section compared to a cross section of at least one portion of an end-section of the absorption member.

19 Claims, 10 Drawing Sheets

STEERING COLUMN ASSEMBLY

CROSS-REFERENCE TO RELATED APPLICATIONS

This application claims priority to German Patent Application No. 102018113817.2, filed 11 Jun. 2018, the disclosure of which is incorporated herein by reference in its entirety.

TECHNICAL FIELD

The present disclosure concerns a steering column assembly for a vehicle, with an energy absorption device.

BACKGROUND

Steering column assemblies for vehicles, with an energy absorption device are known. In the event of a vehicle crash, the energy absorption device dampens the driver's impact on the steering wheel by moving the steering shaft away from the driver and into the instrument panel in an axial direction and energy-absorbing components, such as roller strips or tear roll strips absorb part of the energy of the displacement through plastic deformation.

Steering column assemblies with an energy absorption device are particularly intended for vehicles with an airbag in the steering wheel, which are allowed to be driven without a seatbelt in some countries. The energy absorption device must absorb a significant part of the forces acting on the driver when the driver impacts the steering wheel or airbag, in order to minimize the risk of injury. Furthermore, a storage is provided for when the steering wheel moves towards the instrument panel due to the impact. The storage thus ensures that the steering wheel moves in a predetermined direction, so as for example to avoid downwards displacement and pose a hazard to the driver's legs.

SUMMARY

The object of the invention is to create a compact steering column assembly with an energy absorption device, wherein the energy absorption device also assumes a guidance function for the steering wheel, if in the event of a crash it moves towards the instrument panel.

To achieve the object, a steering column assembly is intended for a vehicle, with a vehicle-fixed storage element to which a receiving element is connected, wherein the receiving element is in operative connection with a steering wheel arrangement, an energy absorption device which is in operative connection to the storage element and to the receiving element, and which provides for at least one elongated absorption member and at least one reduction member with a passage for the absorption member, through which the absorption member extends and which at least partially has a smaller cross section compared to a cross section of at least one portion of an end-section of the absorption member, wherein the absorption member with either the storage element or the receiving element and the reduction member is secured to the other of the two elements of the storage element or receiving element, in which in the event of an exceedance of a limit value of an energy input in the steering wheel arrangement, the storage element and the receiving element are coupled to each other in an adjustable longitudinal manner such that a relative longitudinal movement occurs between the absorption member and the reduction member, in which as a result of the longitudinal movement a traction force acts on the absorption member and the end section of the absorption member is plastically deformed by the smaller section of the reduction member in the cross section, wherein the receiving element is stored on the storage element in the relative longitudinal displacement by means of the energy absorption device.

The absorption member is pulled through a constriction, i.e. the passage in the reduction member, and is thereby plastically deformed. Through this embodiment, in which the absorption member is pulled through a preferably completely closed constriction (in a radial direction), the energy absorption device is constructed in an extremely simple and compact way and thus also produced cost-effectively. If there has been mention previously and subsequently of a relative movement, this means that either the absorption member is fixed and the reduction member is moved along the absorption member or vice versa that the absorption member is moved and the reduction member is stationary.

Thus, where at least one absorption member is subjected to tension, it is sufficient to hold it at one end, wherein the opposite end which is allocated to the end section does not necessarily have to be stored.

The passage can be formed by a preferably completely closed matrix.

The matrix can for example be attached to the entire exterior of the absorption member, and penetrate these sections longitudinally in the event of a vehicle crash.

In order to ensure that the absorption member does not tear and thus no tension peak arises at the beginning of the motion process, the passage continuously narrows laterally or radially to the absorption member in the direction of the retaining section which is opposite the end section.

Conical shapes of the passage or arc-shaped cross-sectional shapes can be realized favorably in the cross section here.

If necessary, the absorption member itself can be designed in such a way that it has different cross sections or material properties in the end section, in order to allow an adjustment of the force-path development.

In order to be able to assemble the absorption member easily, it is advantageous for the absorption member in the initial state, i.e. before a vehicle crash, to have a cross section in one mounting end, which is opposite the end section, until at least the passage has a cross section which allows a movement through the passage without plastic deformation. This means that the absorption member initially advantageously comprises different cross-sections. The mounting end with the smaller cross section can be put through the passage for assembly without causing a deformation. A transition section is provided between the first longitudinal section and the second longitudinal section. The transition section between the two cross-sections is particularly intended to avoid abrupt cross-sectional changes.

The abovementioned limit value of the energy input to the steering wheel arrangement is decisive for the energy absorption requirement of the energy absorption device. The limit value is determined by external parameters, such as the mass of the driver, whether the driver has used a seatbelt or not, the current vehicle speed and/or the delay in a vehicle crash.

This means that the energy absorption requirement reflects the expected amount of energy that must be absorbed by the energy absorption device in a vehicle crash to intercept the driver in the best possible way. In order to ensure the reliable functioning of the steering column assembly, the abovementioned limit value of the energy input must first be exceeded in order to cause a relative longitudinal displacement of the receiving element to the storage element, and thus to activate the energy absorption device, i.e. the plastic deformation of the absorption member by the reduction member due to the relative longitudinal displacement. If the limit value is exceeded, then there is a longitudinal displacement of the receiving element to the storage element, and following an activation of the energy absorption device, more precisely, the absorption member is plastically deformed when pulled through the reduction member and the energy is reduced as a result. As has been described above, however, the direction of the longitudinal displacement is also decisive, because the longitudinal displacement of the receiving element with the components mounted on it, such as the steering wheel arrangement, can cause harm to the driver. In the state of the art, therefore, an additional guide element has been provided which determines the direction of the longitudinal displacement when the receiving element has been shifted longitudinally. The present invention combines this guidance feature in the energy absorption device. The absorption member and the reduction member, which are part of the energy absorption device, assume a storage function in order to determine the direction of the longitudinal displacement during the longitudinal displacement of the receiving element and thus to protect the driver from a collision with the receiving element and the mounted components. This embodiment of the energy absorption device can eliminate the separate guide element mentioned above, which saves costs and components while maintaining the same or even improved functionality.

It may also be provided that a direction vector of the longitudinal displacement of the receiving element is the same or almost equal to a direction vector of the end section of the absorption member. Since the absorption member is an elongated component that is pulled through the reduction member when the energy absorption device is activated, the direction vector of the installed absorption member provides the direction of the longitudinal displacement of the receiving element.

Furthermore, it may be provided that the absorption member provides for a support element at exactly one longitudinal end, in which the support element is executed as a separate component or is integrated in the absorption member. Since the absorption member is only used in the direction of traction, it is necessary to ensure that the absorption member can be safely installed with the reduction member and that a traction force can be introduced into the absorption member. For this purpose, it is advantageous if the aforementioned support element is provided, for example, as an eyelet or a flange. It is possible, for example, to use a positive, a substance-to-substance, or a friction connection between the support element and the absorption member. It is however also possible to form the support element from the absorption element, for example by a deformation process or simply by means of a mounting hole or opening.

It may also be provided that the support element is secured to the storage element or secured to the receiving element.

In a further embodiment, it may be provided that the end section of the absorption member provides for at least a first longitudinal section and a second longitudinal section, with the first longitudinal section providing a cross section and the second longitudinal section a cross section, with the cross section of the first longitudinal section being less than the cross section of the second longitudinal section and the first longitudinal section facing the support element. It should be noted that the cross section may each have the same shape or a different shape. The shape can be advantageously formed as a round rod or as a square bar. Shapes such as triangular cross-sections are also possible. This should not represent a final list.

A further embodiment may provide that the reduction member provides for a first recess section corresponding to the first longitudinal section of the absorption member, or that the reduction member should be a first recess section corresponding to the first longitudinal section of the absorption member and a second recess section corresponding to the second longitudinal section.

Furthermore, it may be provided that in the case of relative longitudinal displacement of the receiving element to the storage element, the first longitudinal section of the absorption element and the first recess section of the reduction member form a linear bearing. Here, the length of the first longitudinal section of the absorption member and the length of the first recess section of the reduction member must be formed in such a way that the linear bearing, which is formed thereby can assume guidance and the longitudinal displacement can be effected directionally.

It may also be provided that in the case of the relative longitudinal displacement of the receiving element to the storage element, the second longitudinal section of the absorption element and the second recess section of the reduction member form a linear bearing. This can be beneficial because the second longitudinal section of the absorption element displays a larger cross section than the first longitudinal section. This can enable the achievement of an advantageous guidance feature in the relative longitudinal displacement of the receiving element.

It may also be provided that in the relative longitudinal displacement of the receiving element to the storage element, the first and second longitudinal sections of the absorption element and the first and second recess sections of the reduction member form a linear bearing. It can be advantageous for the function of a linear bearing that as long a path to the storage as possible is available. By providing the almost complete axial length of the reduction member and absorption member as a storage area, an advantageous storage can be achieved with a relative longitudinal displacement of the receiving element to the storage element.

Furthermore, it can be advantageous if the reduction member provides for at least one reduction passage. The reduction passage is mainly used to deform the cross section of the end section of the absorption member plastically to a smaller cross section when the absorption member is pulled through the reduction member. In order to ensure the functional reliability of this plastic deformation of the absorption member, it can be advantageous that the reduction process have a conical shape. This can reduce or even avoid notch effects or constrictions during the plastic deformation that could lead to a material defect in the form of a rupture process of the absorption member. The proposed conical form of the reduction passage should only serve as an example.

It may also be provided that at least one connecting element will be provided between the receiving element and the steering wheel arrangement, with the steering wheel arrangement being rotated to the connecting element. The connecting element advantageously forms a reception of the steering wheel arrangement, which advantageously comprises at least one steering wheel and a shaft. The shaft, in turn, can be twisted in the connecting element, also known as a casing tube.

Furthermore, the connecting element can be connected to the receiving element by means of a locking mechanism, wherein the locking mechanism can take a locked position and an unlocked position. This embodiment is also known as a well-known steering wheel adjustment. The connecting element can be adjusted with the steering wheel arrangement towards the driver or away from the driver as well as in height. The adjustment is advantageous if the locking mechanism is in an unlocked position. If the locking mechanism is in a locked position, the steering wheel arrangement or connecting element is secured to the receiving element. The locking mechanism may be provided mechanically or electromechanically.

Furthermore, it can be advantageous if at least two energy absorption devices are provided and which are distributed symmetrically to the storage element. This embodiment allows a defined longitudinal displacement of the receiving element, or the associated steering wheel arrangement, to be function-proof.

Furthermore, the storage element can provide a linear guide for the receiving element, wherein a guide length of the linear guide is shorter than a guide length of the linear bearing. The storage element is advantageously stored directly on the receiving element. This means that in hibernation, that is, if there is no longitudinal displacement of the receiving element and in the event of an initial longitudinal displacement of the receiving element, this linear guide mainly assumes storage of the receiving element. Only when the linear guide ends does the linear bearing, which is formed here by the energy absorption device, assume the linear storage in the event of further longitudinal displacement of the receiving element.

Furthermore, it can be advantageous if the absorption member is constructed of a ductile material at room temperature. Since the absorption member is supposed to deform plastically during the longitudinal displacement, it is necessary that the absorption member is made of a non-brittle material, i.e, from a ductile material. These materials can advantageously be a steel material or an aluminum material, or a copper material, to name just a few examples. The absorption member or, more precisely, the end section of the absorption member, can also have a cross section with different shapes. For example, the end section can be advantageously embodied as a round or a flat rod. In the event that a round rod is used, a 4 mm to 15 mm diameter of the end section has proved beneficial to its functioning as an energy absorption device and as a linear guide.

The invention is described in more detail in the following examples.

BRIEF DESCRIPTION OF THE DRAWINGS

Further features and advantages of the invention will be evident from the following description of a preferred embodiment with reference to the drawings, wherein.

Like reference numerals refer to like parts throughout the description of several views of the drawings.

DETAILED DESCRIPTION

Figure 1:
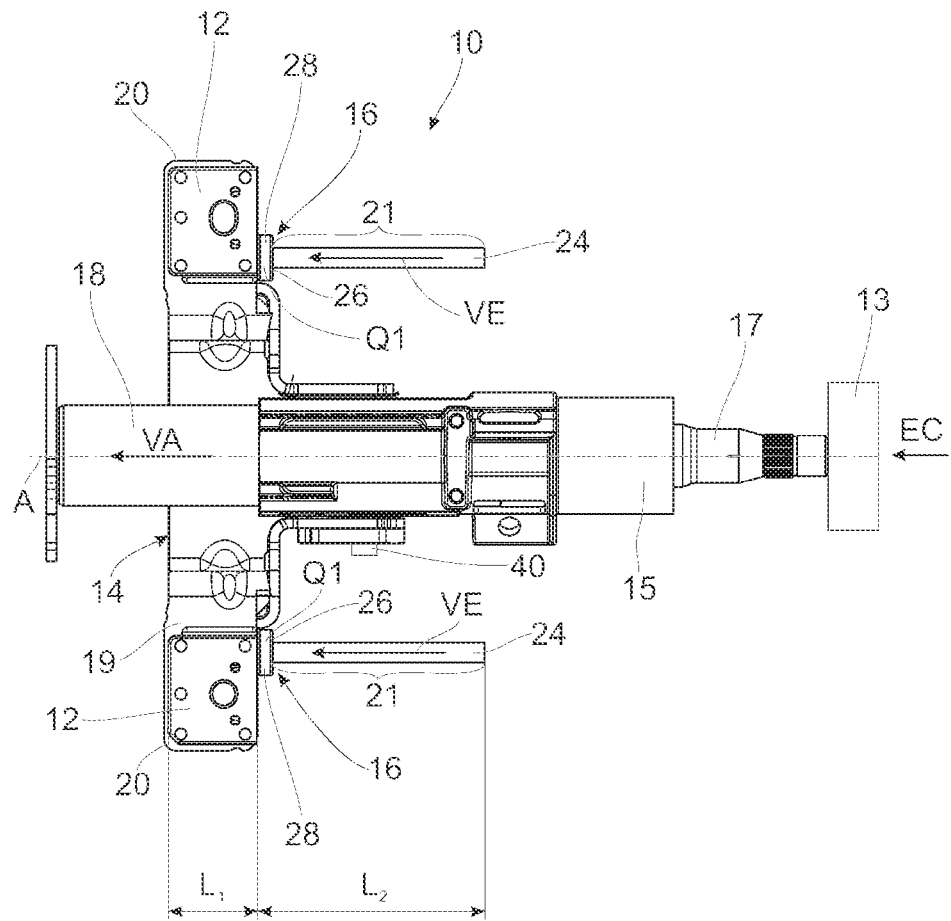
FIG. 1 illustrates a plan view of an inventive steering column assembly.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows an overall presentation of an inventive steering column assembly 10. FIG. 1 shows the functionally relevant components of the invention. A steering wheel arrangement 13, which is connected to a steering wheel shaft 17 so that it cannot be rotated, is stored in a connecting element 15 so that it can be twisted. The connecting element 15 is connected to a receiving element 14 and is adjustable in height and length. A locking mechanism 40, which is not described in detail here, thus connects the connecting element 15 with the connecting element 14 in a form such that the receiving element 15 is secured to receiving element 14 in a locked position of the locking mechanism 40. In case the locking mechanism 40 is in an unlocked position, the connecting element 15 to the receiving element 14 can be changed in height and also in length, i.e. in an axial direction. The connecting element 15 can be adjusted with the steering wheel arrangement 13 towards the driver or away from the driver as well as in height. The receiving element 14 mainly comprises a tube 18 and a console 19 secured to the tube. Flaps 20 are formed on both sides of the console 19. The flap 20 is located in a storage element 12, wherein the storage element 12 is fixed to the vehicle, for example a crossbar, not shown here. The flap 20, in the case of a relative longitudinal displacement of the receiving element 14 to the storage element 12, can move axially in the storage element 12. Further, a reduction member 28 is secured to the storage element 12. The reduction member 28 can also be described as a matrix. Further, an absorption member 24 is secured to the flap 20. If an energy input EC is now made in the steering wheel arrangement 13, for example in the event of a collision in which the driver, who is sitting behind the steering wheel arrangement 13, and whose body collides with the steering wheel arrangement 13 and thus an energy input limit value is exceeded, a relative longitudinal displacement of receiving element 14 to storage element 12 occurs, against the force of an energy absorption device 16, which mainly comprises the absorption member 24 and the reduction member 28. Since the receiving element 14 is also connected with the connecting element 15 and the steering wheel arrangement 13, this entire unit is displaced longitudinally relative to the storage element 12. Since the reduction member 28, i.e, the matrix, has a smaller inner cross section than an end section 21 of the reduction member 28, the end section 21 is pulled through the reduction member 28 if the receiving element 14 is displaced longitudinally to the storage element 12. This results in a plastic deformation of the end section 21 into a smaller cross section, which is determined by the smaller cross section of the reduction member 28. The energy required for the process of plastic deformation of absorption member 24 is taken from the energy input EC that exceeds the limit value. This means that in the event of a collision, the EC energy input to the steering wheel arrangement 13 is at least partially absorbed by the energy absorption device 16. This allows the collision of the driver with the steering wheel arrangement to be absorbed, so that there may be a lower risk of injury to the driver than if the steering wheel arrangement 13 were connected to the storage element 12 in a way that prevented displacement. If this longitudinal displacement of the receiving element 14 to the storage element 12 occurs and if the path of the longitudinal displacement is longer than a guide length L1 of the flaps 20 into the storage element 12, then in accordance with the invention the further linear guidance of the receiving element 14 is formed by the energy absorption device 16. Reference is made to FIGS. 17 to 19, in which the linear guidance of the energy absorption device 16 is described in detail. It should also be noted here that one direction of the longitudinal displacement VE of the receiving element 14 is specified by one direction or by a direction vector VA of the end section 21 of the reduction member 28. This means that in a collision the steering wheel arrangement 13 with the receiving element 14 moves away from the driver in a longitudinal direction, which is indicated by the direction of the end section 21 of the reduction member 28. This means that the energy absorption device 16, which consists mainly of the reduction member 28 and the absorption member 24, assumes two tasks. On the one hand, the energy absorption device 16 assumes the task of absorbing energy in the event of a collision, i.e. in the case of an energy input EC to the steering wheel arrangement, and transforming it into a plastic deformation of the end section 21. In a further task, the energy absorption device 16 with a guide length L2 of the absorption member 24 assumes a guidance function for the receiving element 14 and for the components connected to the receiving element 14, if in the case of a longitudinal displacement of the steering wheel arrangement 13 with the receiving element 14 to the storage element 12, especially if the flap 20 has extended from the guide length L1 of the storage element 12. Since the guide length L2 is greater than the guide length L1, the receiving element 14, after the receiving element 14 has extended past the guide length L1, is continued through the guide length L2. This means that a separate guide element known in the state of the art can be dispensed with, which saves components and production costs.

Figure 2:
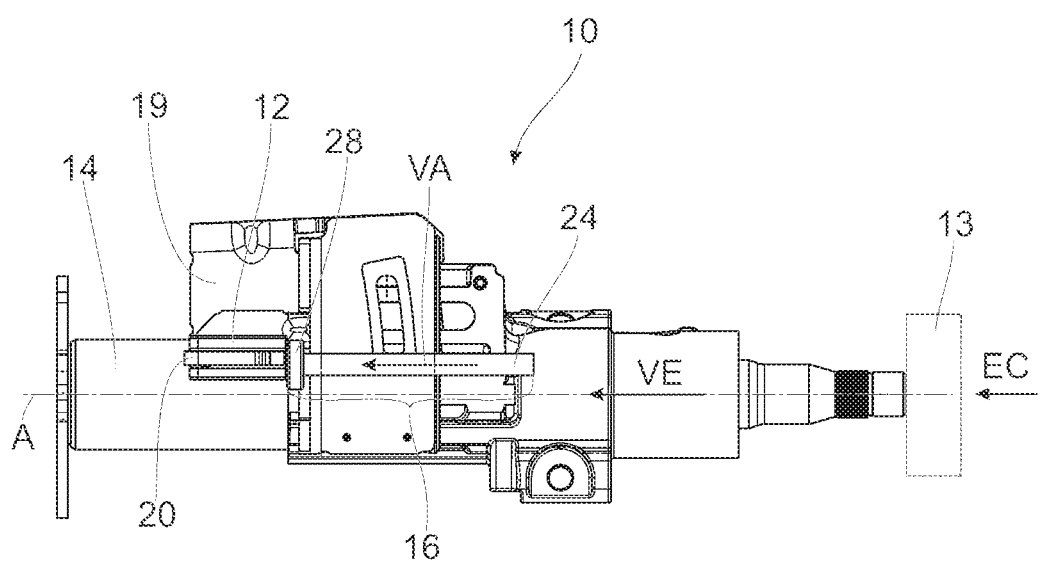
FIG. 2 shows a side view of a steering column assembly 10 as already described in FIG. 1

FIG. 2 shows a side view of a steering column assembly 10 as already described in FIG. 1. In this FIG. 2 it is easy to see that the flap 20 is secured to the console 19 and thus is secured to the receiving element 14 in which storage element 12 is housed. It is not shown here that the storage element 12 is secured to the body, advantageously with a crossbar. If, for example, when a limit value of an energy input EC is exceeded, the receiving element 14 is moved towards the energy input EC, the flap 20 slides along the storage element 12 until the flap 20 completely extends from the storage element 12. If there is a further longitudinal displacement of the receiving element 14 towards the energy input EC, the further storage or guidance in the longitudinal direction of the receiving element 14 is determined by the energy absorption device 16, which is mainly composed of the reduction member 28 and the absorption member 24. A direction vector VE of the receiving element 14, i.e, the actual direction of the receiving element 14, is determined by the direction vector VA of the reduction member 28, more precisely the end section 21 of the reduction member 28. This is advantageous in order to achieve a targeted longitudinal displacement of the receiving element 14 and the components connected to the receiving element 14. The end section 21 of the reduction member 28 is formed as a round rod.

Figure 3:
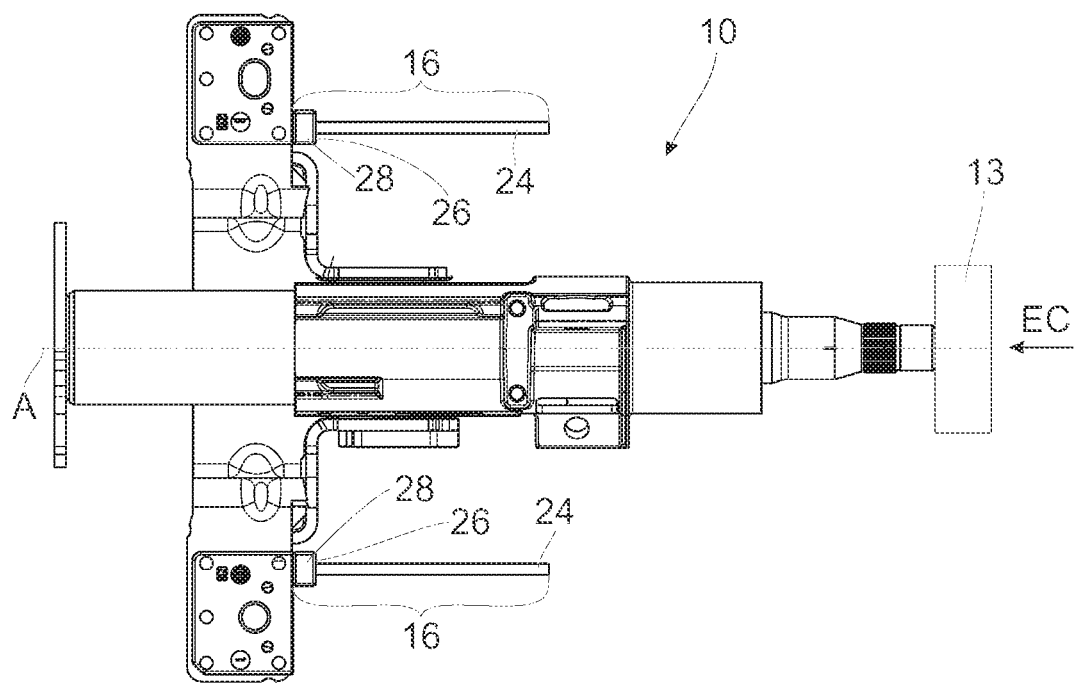
FIG. 3 shows another embodiment of a steering column assembly wherein the absorption member is a flat rod.
Figure 4:
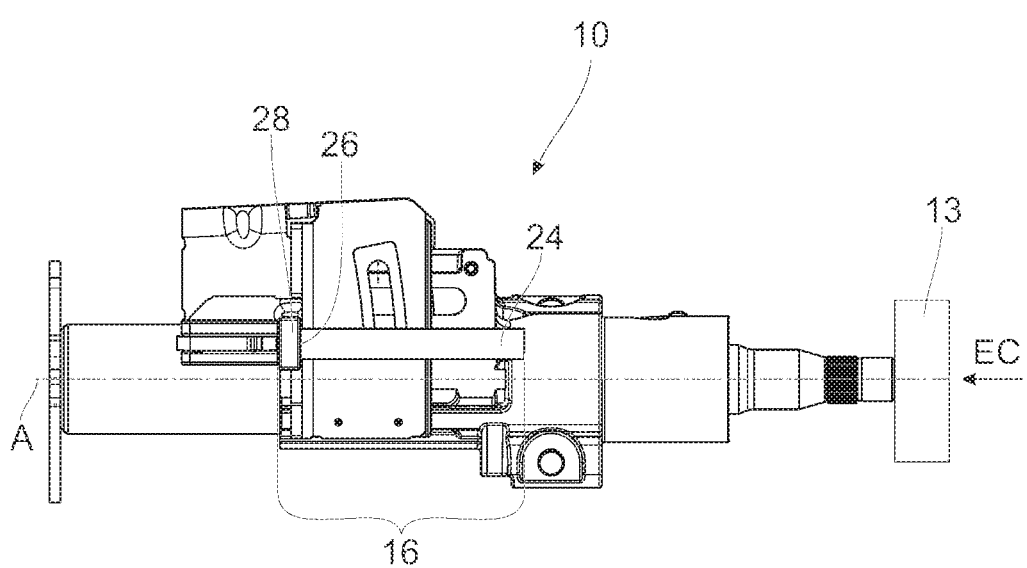
FIG. 4 shows a side view of the steering column assembly in FIG. 3.

FIGS. 3 and 4 show a comparable steering column assembly 10 as already described in FIGS. 1 and 2, but here the absorption member 24 of the energy absorption device 16 is not executed as a round rod but as a flat rod. Thus, a passage 26 of the reduction member 28 is also designed accordingly on the flat rod.

Figure 5:
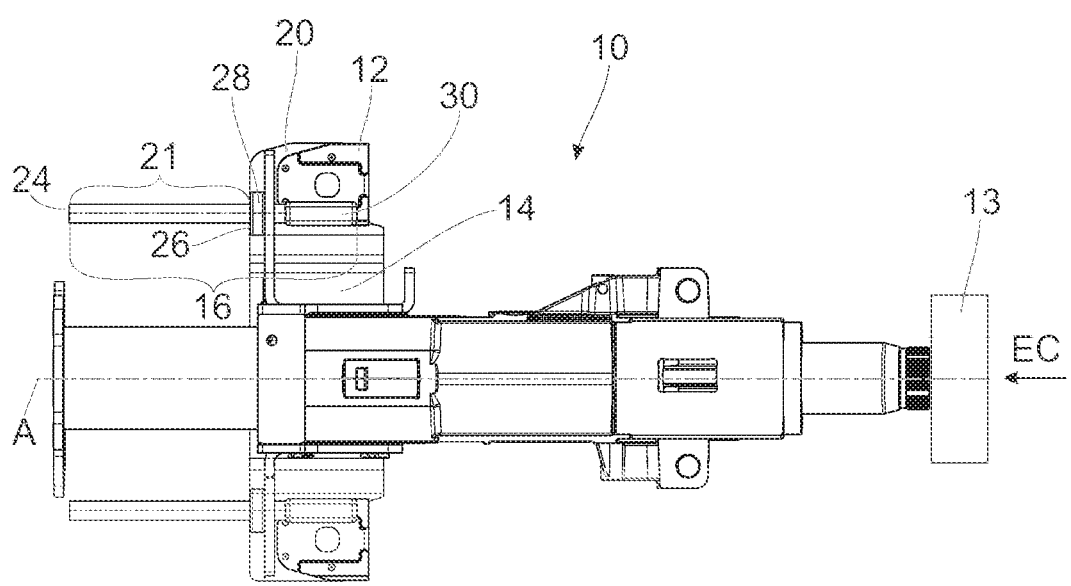
FIG. 5 illustrates a plan view a third embodiment of the steering column assembly wherein the arrangement of the energy absorption device is arranged inversely.
Figure 6:
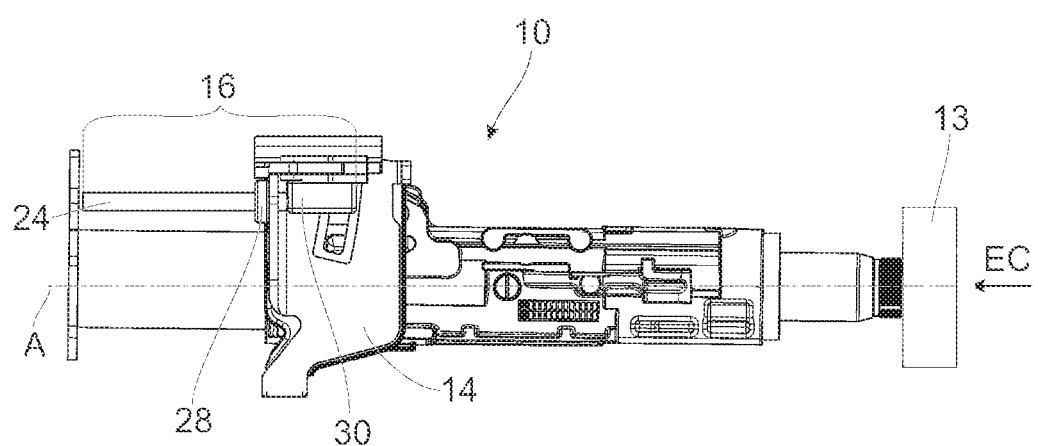
FIG. 6 shows a side view of the steering column assembly in FIG. 5.

FIGS. 5 and 6 show a comparable steering column assembly 10 as already described in FIGS. 1 to 4, but here the arrangement of the energy absorption device 16, in contrast to FIGS. 1 to 4, is arranged inversely. This means that the reduction member 28 is secured to the receiving element 14. The absorption member 24, in turn, is secured to the storage element 12 by means of a support element 30. As previously described, the support element 30 is secured to the end section 21 and together they form the absorption member 24. If a longitudinal displacement of the receiving element 14 is now carried out as already described in FIGS. 1 to 4, the reduction member 28 with the receiving element 14 moves towards the energy input EC. As the absorption member 24 is secured to the not shown body or crossbar by means of the storage element 12 so that it cannot be displaced, the tensile stress on the absorption member 24 occurs and the end section 21 of the absorption member 24 is plastically deformed by the reduction member 28, more precisely through the passage 26. This arrangement can be advantageous, as the end section 21 now extends away from the driver's side. As a result, the end section 21 of absorption member 24 cannot be a source of injury, on the one hand, and, on the other hand, a free construction space can be created in the direction towards the driver. The actual function of the energy absorption device 16, namely, on the one hand, in the event of a collision, to reduce the energy placed on the steering wheel arrangement 13, and, on the other hand, the longitudinal displacement of the receiving element 14 in a defined direction. i.e. to store it, remains the same. Accordingly, the energy absorption device 16 assumes two functions again, which are the energy absorption and the storage functions.

Figure 7:
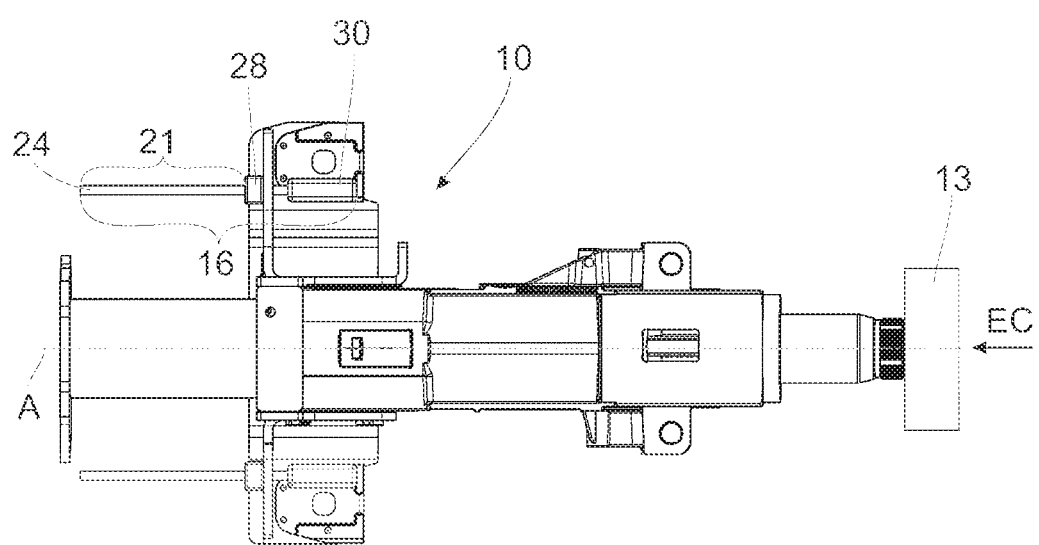
FIG. 7 illustrates a fourth embodiment of the steering column assembly.
Figure 8:
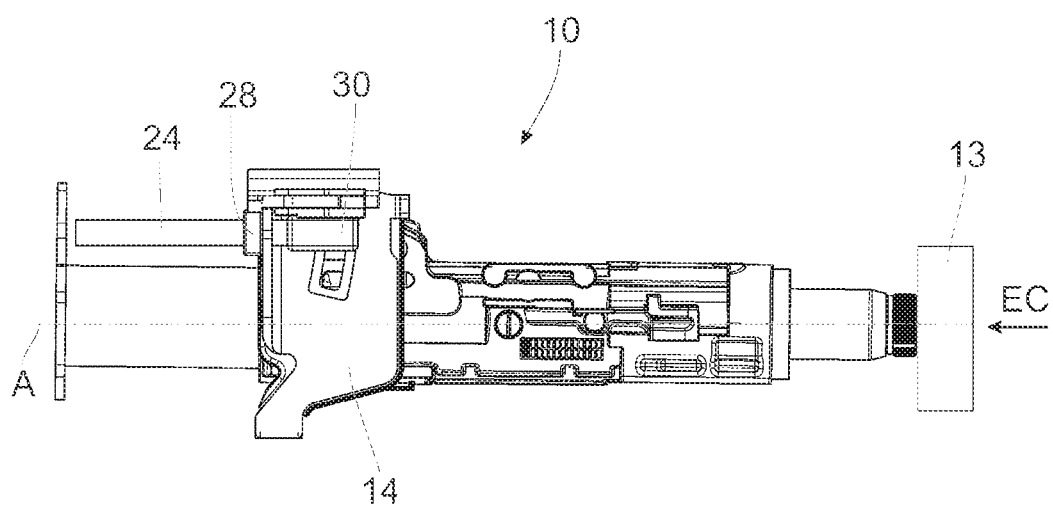
FIG. 8 shows a side view of the steering column assembly in FIG. 5 wherein the absorption member is a flat rod.

FIGS. 7 and 8 show a steering column assembly 10, as already described in FIGS. 5 and 6, but here the end section 21 of the absorption member 24 is not designed as a round rod but as a flat rod.

Figure 9:
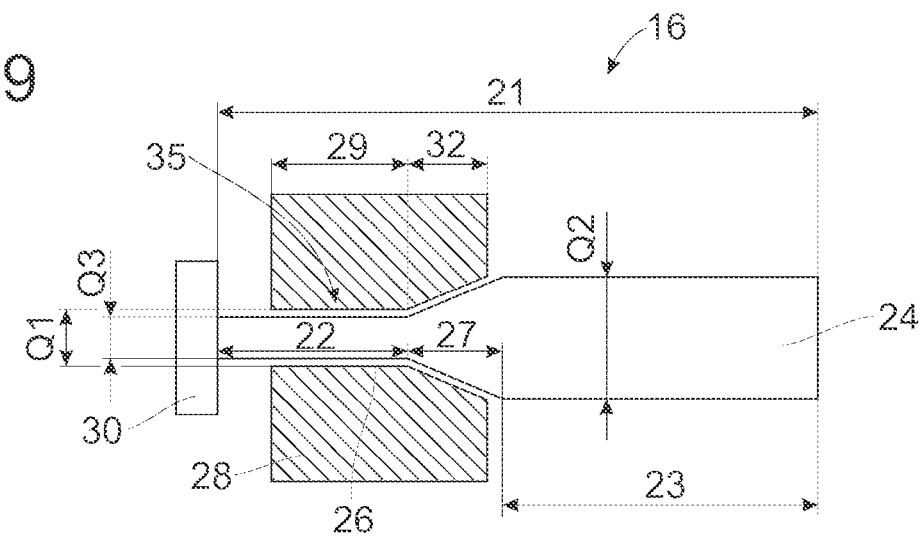
FIG. 9 illustrates a cross section of a first energy absorption device.
Figure 10:
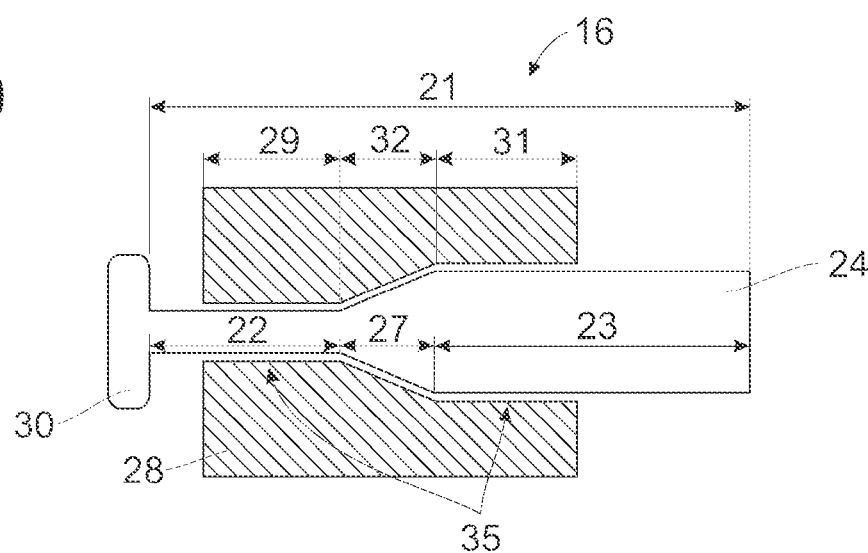
FIG. 10 shows that the support element is shaped by an upsetting process.
Figure 11:
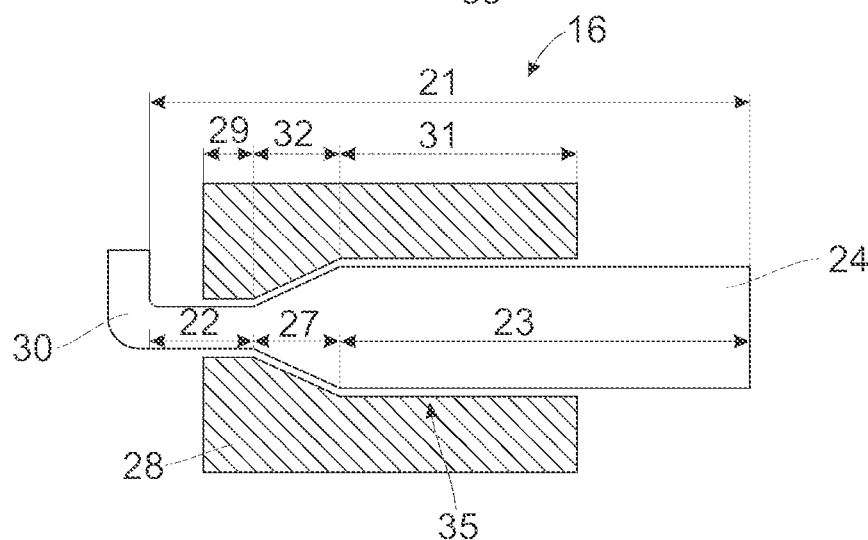
FIG. 11 shows that the support element is formed by a reshaping process from the absorption member.
Figure 12:
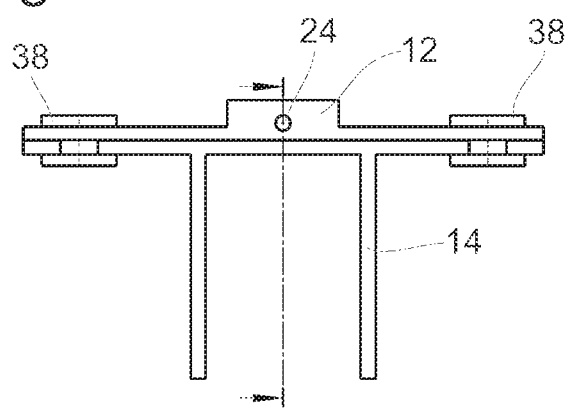
FIG. 12 shows a fifth embodiment of the present disclosure wherein a centrally positioned energy absorption device is disposed in the middle

FIGS. 9, 10 and 11 are examples of an energy absorption device 16, each in a cross section. FIGS. 9, 10 and 11 illustrate different embodiments of how the energy absorption device 16 can function as a storage for the storage element 12 when there is a longitudinal displacement of the receiving element 14. With reference to FIG. 9, an energy absorption device 16 is shown, comprising mainly an absorption member 24 and a reduction member 28. The absorption member 24 is elongated, for example as a round rod. A support element 30 is provided at one end, which is secured here to the absorption member 24. The support element 30 can be connected to the absorption member 24, for example, by means of a screw, a rivet, a weld or any other known type of connection, as shown for example in FIG. 9. In FIGS. 10 and 11, on the other hand, the support element 30 is formed of the absorption member 24 itself, after the installation of the absorption member 24 in the reduction member 28. FIG. 10 shows that the support element 30 is shaped by an upsetting process. FIG. 11 shows that the support element 30 is formed by a reshaping process from the absorption member 24. An end section 21 extends in an axial direction to the support element 30. The end section 21 is further divided into a first longitudinal section 22 and a second longitudinal section 23. A conically shaped transition section 27, as shown here, is provided between the first longitudinal section 22 and the second longitudinal section 23. The reduction member 28 is provided with a passage 26, with the passage 26 extending into two portions. One portion is the first recess section 29 and a second portion is executed as a reduction passage 32. The first recess section 29 has a cross section Q1, wherein the first longitudinal section 22 of the absorption member 24 extends with the cross section Q3. The reduction passage 32 of the reduction member 28 is also conical, corresponding to the transition section 27 of the absorption member 24. This means that most of the first longitudinal section 22 and the transition section 27 of the absorption member extend into passage 26 of the reduction member 28. In order to be able to ensure storage in a relative longitudinal displacement by the energy absorption device 16, as previously described, the first longitudinal section 22 of the absorption member 24 and the first recess section 29 of the reduction member 28 assume the actual storage function and thus form a linear bearing 35.

FIG. 10 shows an energy absorption device 16 as already described in FIG. 9, but the reduction member 28 now extends over the second longitudinal section 23 of the absorption member 24. This means that the reduction member 28, in addition to the first recess section 29 and the reduction passage 32, now also provides for a second recess section 31. This means that with a relative longitudinal displacement of the receiving element 14 to the storage element 12, both not shown here, but previously described, the first and the second longitudinal sections 22, 23 of the absorption element 24 and the first and second recess sections 29, 31 of the reduction member 28 form a linear bearing 35.

FIG. 11 shows an energy absorption device 16, as already described in FIGS. 9 and 10, but here the first recess section 29 of the reduction member 28 is executed short and thus assumes no or only a small storage function. As a result, the second evaluation section 31 of the reduction member 28 with the second longitudinal section 23 of the absorption member 24 assumes the actual storage function and therefore forms the linear bearing 35.

It should also be noted that the embodiments in FIGS. 9, 10 and 11 are merely examples of ways to execute the energy absorption device 16 as a linear bearing 35.

Figure 13:
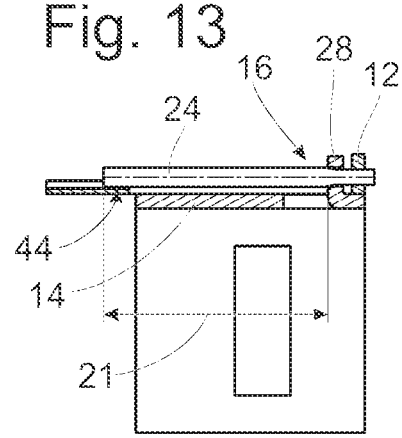
FIG. 13 illustrates a side view of the centrally positioned energy absorption device of FIG. 12.
Figure 14:
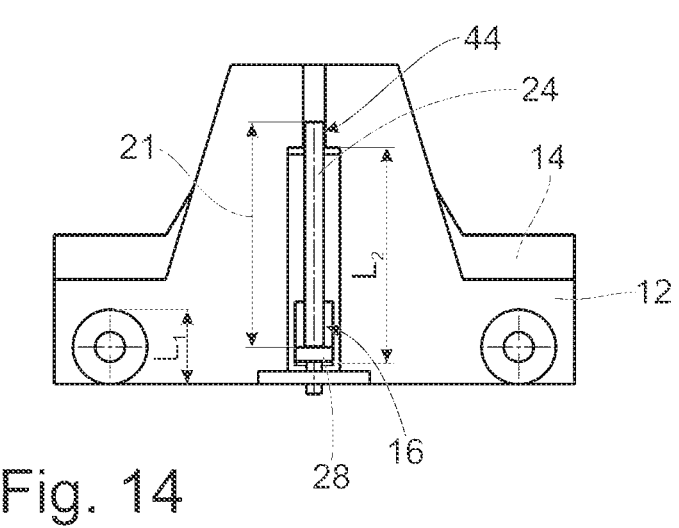
FIG. 14 illustrates a lower view of the centrally positioned energy absorption device of FIG. 12.
Figure 15:
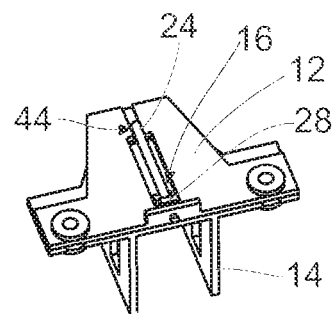
FIG. 15 illustrates an isometric view of the centrally positioned energy absorption device of FIG. 12.

FIGS. 12 to 15 show another embodiment according to the invention. These figures are intended to represent a centrally positioned energy absorption device 16 in the middle. For this purpose, only the essential components of the invention are shown here in FIGS. 12 to 15. In contrast to the previous embodiments with two energy absorption devices 16 arranged in parallel, a centrally placed energy absorption device 16 can again reduce components and thus manufacturing and production costs. A single energy absorption device 16, which is placed advantageously in the middle of the storage element 12 and the receiving element 14, assumes both the task of energy absorption in the event of a crash, as well as the guidance function in case the receiving element 14 moves relative to the storage element 12. It is also easy to see here, especially in FIG. 14, that the guide function with the guide length L2 of the energy absorption device 16 is taken over only if the receiving element 14 from the guide length L1, which is formed here by parallel spacer members 38, which are secured to the storage element 12, has been extended. Also easy to see, especially in FIGS. 13, 14 and 15, is a support point 44 of absorption member 24 to the storage element 12. This also stores absorption member 24 in order to further improve the aforementioned guidance function of the energy absorption device 16. A length of the guidance of the energy absorption device 16 can be defined by a length of the end section 21 of the absorption member 24, among other things. Reference is also made to previous statements, which have already disclosed the function of energy absorption device 16.

What is claimed is:

1. A steering column assembly for a vehicle, with a vehicle-resistant storage element and a receiving element stored on it,
    wherein the receiving element is in operative connection with a steering wheel arrangement, an energy absorption device that is in an operative connection with the storage element and the receiving element and which provides for at least one elongated absorption member as well as at least one reduction member with a passage for the absorption member through which the absorption member extends and which at least partially has a smaller Q1 cross section in comparison to a Q2 cross section of at least one portion of an end section of the absorption member,
    wherein the storage element and the receiving element are secured, in case of exceeding a limit value of an energy input into the steering wheel arrangement to each other and broadly coupled in such a way that a relative longitudinal movement occurs between the absorption member and the reduction member,
    wherein as a result of the longitudinal movement a pulling force is exerted on the absorption member and wherein the end section of the absorption member is plastically deformed by movement through the passage of the reduction member, wherein the receiving element in the case of the relative longitudinal movement using the energy absorption device is stored on the storage element.

2. Steering column assembly for a vehicle according to claim 1 wherein a VA direction vector of the longitudinal movement of the receiving element is equal or almost equal to a VE direction vector of the end section of the absorption member.

3. Steering column assembly for a vehicle according to claim 1 wherein the absorption member provides for a support element at exactly one end of a length of the absorption member, wherein the support element is a separate component or is an integral part of the absorption member.

4. Steering column assembly for a vehicle according to claim 3 wherein the support element is secured to the storage element or secured to the receiving element.

5. Steering column assembly for a vehicle according to claim 4 wherein the end section of the absorption member provides for at least one first longitudinal section and one second longitudinal section, with the first longitudinal section having a Q3 cross section and the second longitudinal section having a Q2 cross section, wherein the Q3 cross section of the first longitudinal section is shorter than the Q2 cross section of the second longitudinal section and the first longitudinal section is directed towards the support element.

6. Steering column assembly for a vehicle according to claim 5 wherein the reduction member provides for a first recess section corresponding to the first longitudinal section of the absorption member or that the reduction member provides for a first recess section corresponding to the longitudinal section of the absorption member and a second recess section corresponding to the second longitudinal section.

7. Steering column assembly for a vehicle according to claim 6 wherein the relative longitudinal movement of the receiving element to the storage element, the first longitudinal section of the absorption member, and the first recess section of the reduction member form a linear bearing.

8. Steering column assembly for a vehicle according to claim 6, wherein in the relative longitudinal movement of the receiving element to the storage element, the second longitudinal section of the absorption member and the second recess section of the reduction member form a linear bearing.

9. Steering column assembly for a vehicle according to claim 6 wherein the relative longitudinal movement of the receiving element to the storage element, the first and the second longitudinal sections of the absorption member and the first and second sections of the recess section of the reduction member form a linear bearing.

10. Steering column assembly for a vehicle according to one to claim 1 wherein the reduction member has at least one reduction passage.

11. Steering column assembly for a vehicle according to claim 1 wherein at least one connecting element is provided between the receiving element and the steering wheel arrangement, wherein the steering wheel arrangement is stored on the connecting element in a way that allows it to be twisted.

12. Steering column assembly for a vehicle according to claim 11 wherein the connecting element is connected to the receiving element by means of a locking mechanism, in which the locking mechanism can assume a locking position and an unlocking position.

13. Steering column assembly for a vehicle according to claim 12 wherein the connecting element can be moved in height and length by means of the locking mechanism in an unlocked position to the receiving element.

14. Steering column assembly fora vehicle according to claim 12 wherein the connecting element is secured to the receiving element in the locked position by means of the locking mechanism.

15. Steering column assembly for a vehicle according to claim 12 wherein the locking mechanism is mechanical or electromechanical.

16. Steering column assembly for a vehicle according to claim 1 wherein at least two energy absorption members are provided, which are distributed symmetrically to the storage element.

17. Steering column assembly for a vehicle according to claim 1 wherein the storage element provides a linear guide for the receiving element, wherein an L1 guide length of the line guide is shorter than an L2 guide length of the linear bearing.

18. Steering column assembly for a vehicle according to claim 1 wherein the absorption member is made of a material that is ductile at room temperature.

19. Steering column assembly for a vehicle according to claim 18 wherein the material is in particular a steel material or an aluminum material, or a copper material.

* * * * *